United States Patent
Gozlan

[15] 3,660,982
[45] May 9, 1972

[54] NON-RETURN DEVICE FOR FLUID DUCTS AND THRUST REVERSERS

[72] Inventor: Albert Gozlan, Asnieres, France
[73] Assignee: Societe Nationale Industrielle Aerospatiale, Paris, Seine, France
[22] Filed: Mar. 3, 1970
[21] Appl. No.: 16,042

[30] Foreign Application Priority Data

Apr. 28, 1969 France.................................6925798
Dec. 30, 1969 France.................................6945547

[52] U.S. Cl...................................60/230, 60/226, 60/262, 60/231, 60/232
[51] Int. Cl..........................................................F02k 1/24
[58] Field of Search ...........................60/232, 230, 231, 226

[56] References Cited

UNITED STATES PATENTS

| | | |
|---|---|---|
| 3,002,342 | 10/1961 | Schatzki...............................60/230 X |
| 3,233,833 | 2/1966 | Bertin...................................60/231 X |
| 3,096,049 | 7/1963 | Karasinski.............................60/230 X |
| 3,024,602 | 3/1962 | Bertin...................................60/231 X |
| 3,475,912 | 4/1969 | Angier..................................60/230 X |

FOREIGN PATENTS OR APPLICATIONS

| | | |
|---|---|---|
| 517,469 | 2/1953 | Belgium................................60/226 |
| 618,830 | 4/1961 | Canada.................................60/231 |

*Primary Examiner*—Clarence R. Gordon
*Attorney*—Karl W. Flocks

[57] ABSTRACT

An ejector of the deflected flow type, including a primary duct and a secondary duct, the pressure in the primary duct being higher than that in the secondary duct, the secondary and primary flows being mixed on exit from a common throat-section, the mixture being deflected by a wall opposed transversely to the general direction of the two ducts, within at least one outlet means and in a plane of symmetry of the ejector, at least two non-return deflectors being provided on either side of said plane of symmetry, adjacent lateral walls of the ejector and in the return path of the primary flow deflected by said wall, whereby to deflect in a downstream direction those backflowing streams of said primary flow which are located laterally in relation to the outlet means and which would tend to flow back into said secondary duct, thus avoiding exagerate heating of the ducts.

19 Claims, 28 Drawing Figures

PATENTED MAY 9 1972 3,660,982

Inventor
Albert Goglan
By
Karl W. Flocks
Attorney

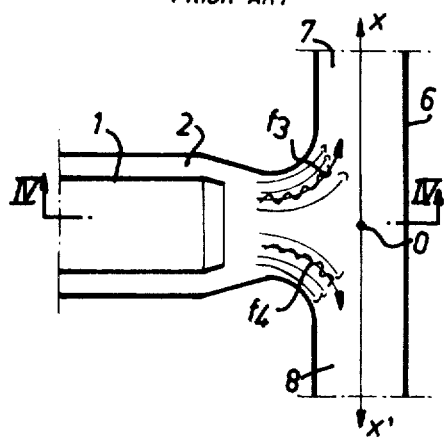
FIG. 3
PRIOR ART
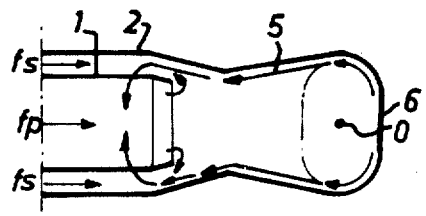
FIG. 4
PRIOR ART
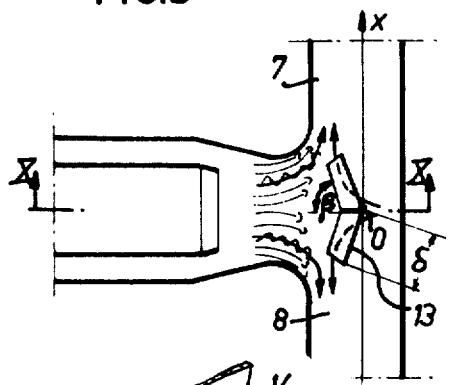
FIG. 9
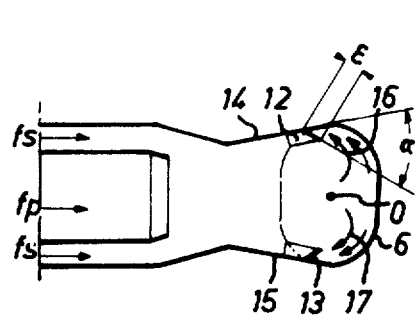
FIG. 10
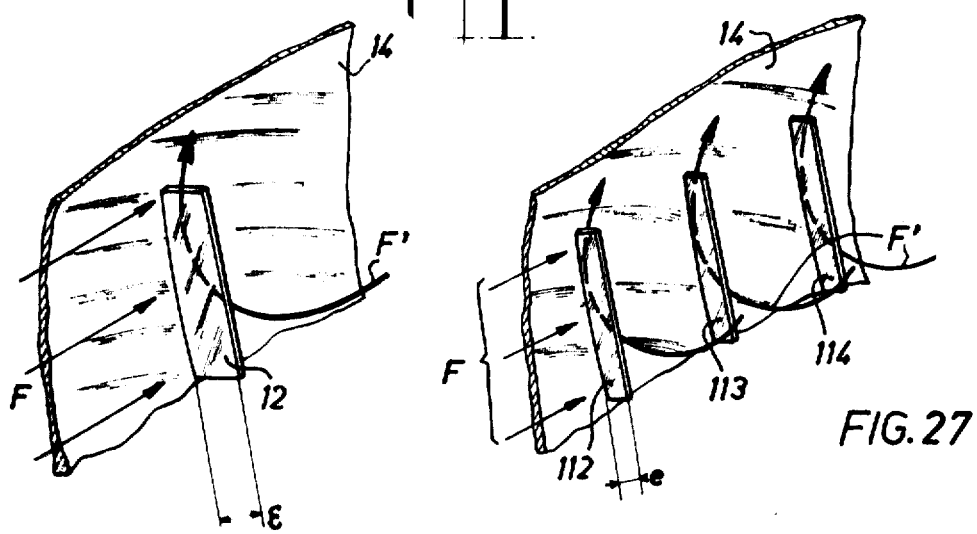
FIG. 28
FIG. 27

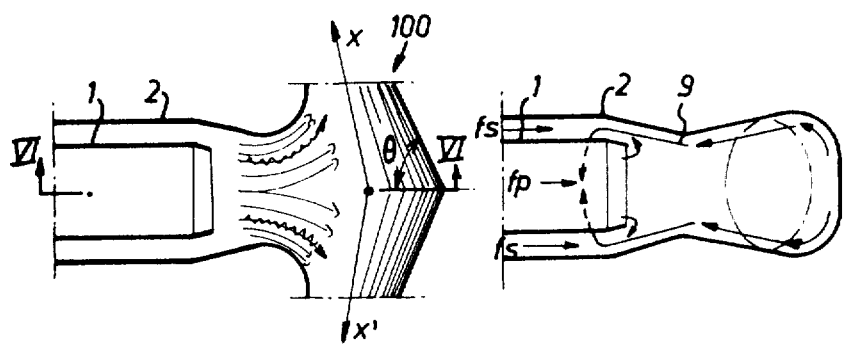
FIG.5 PRIOR ART
FIG.6 PRIOR ART
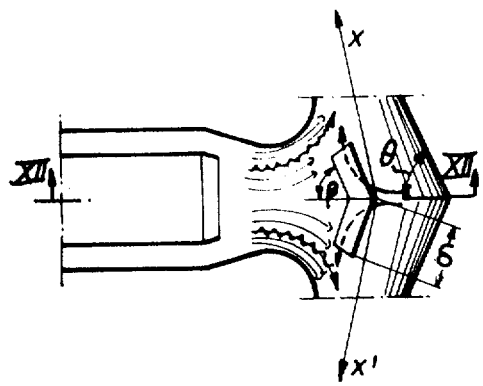
FIG.11
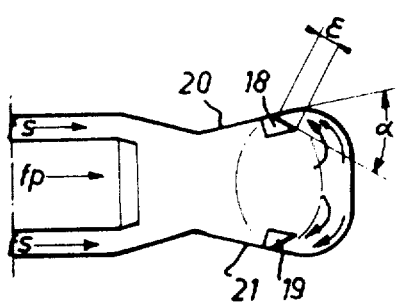
FIG.12

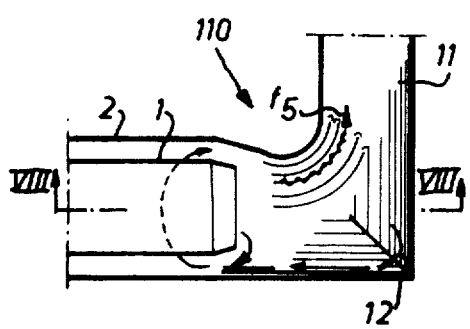
FIG.7 PRIOR ART
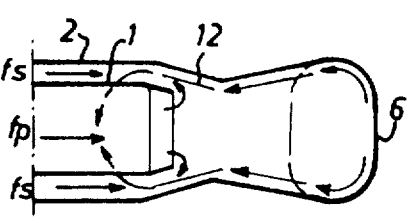
FIG.8 PRIOR ART
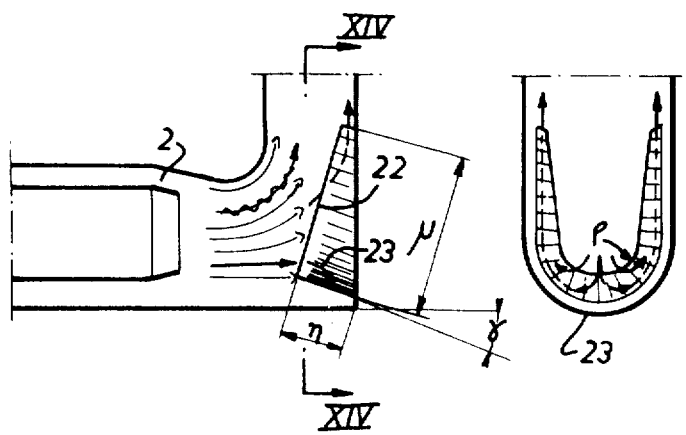
FIG.13
FIG.14

3,660,982

NON-RETURN DEVICE FOR FLUID DUCTS AND THRUST REVERSERS

This invention relates to a non-return device for fluid ducts and thrust reversers, and more particularly to a device for ejectors and like conduits such as are employed at the rear of thrust reversers in order to reverse the fluid efflux while at the same time preventing the inductive primary flow from returning upstream into the secondary-flow duct.

As is well known, ejectors receive the inductive or primary flow issuing from a primary duct, where the total head is high, in order either to entrain a certain induced flow through the secondary duct or to maintain a certain low pressure level in said secondary duct, the flow therethrough being accordingly near-zero or zero. The entrainment effect is obtained in either case by gradually mixing the primary and secondary flows, either completely or partially. This mixing is effected along the surface separating the two flows, within a single duct known as a mixing duct (hereinafter referred to as the "mixer").

By making the mixer long enough, it is possible to obtain, for all practical purposes, a homogeneous and uniform exit flow therefrom. If the mixer is too short, mixing is effected only partially.

In some cases it may furthermore be necessary to deflect or divide the ejector flows before mixing of the primary and secondary flows has been fully accomplished.

It has been found that in such cases there is a marked decay in ejector performance owing to the fact that the pressure level induced in the secondary duct increases while the induced flow decreases. Further, the flow often becomes unstable, thereby causing a high level of vibration.

Exhaustive theoretical and experimental research conducted by the applicant, involving flow visualizations and measurements on diverted-flow ejectors, has shown that the performance decay and possible condition of unstable operation are closely related to the existence of return flows issuing from primary-flow areas where the static pressure approaches its maximum value, namely the total head of the primary flow. Such backflows move towards the upstream end of the secondary flow where static pressures are low. Now the high-static-pressure areas of the primary flow occur in particular adjacent a reversing wall designed to deflect or divide the primary flow issuing from the ejector, since the flow velocities are lowest in that area.

The above drawbacks are encountered especially on aircraft turbojets equipped with thrust reversers in which the high-temperature primary flow tends to backflow towards the secondary-flow duct on the upstream side and to thereby overheat areas not designed to withstand such temperatures.

In the case of supersonic aircraft in particular, recourse is often had to two-flow jet nozzles which in point of fact form veritable ejectors in which the primary flow is constituted by the hot stream of high total head issuing from the jet engine and in which the secondary flow is constituted by air bled from the main air inlet of the engine or scooped from auxiliary inlets. An ejector of this type usually has symmetry of revolution or a configuration very close thereto. The available mixing length is in general very much less than what would be desirable to ensure homogeneous mixing of the two flows.

Accordingly, when it is required to deflect the flow from such a two-flow jet pipe in an upstream direction, in order for instance to engender a short-duration thrust, it becomes necessary to deflect the ejector flow.

The present invention provides a non-return deflector or backflow diverter for a deflected-flow ejector that obviates the major part of the aforementioned drawbacks ascribable to return flows and limits the troublesome consequences thereof.

A deflector according to the invention includes a set of fluid flow deflecting elements or deflectors which divert, into the low-static-pressure downstream areas, the stream elements of the inductive fluid flow which would otherwise tend to backflow into the secondary duct, especially in the lateral regions of the deflected stream, on either side of the centerplane thereof.

The position, shape and size of the deflecting elements naturally depend on the geometric, aerodynamic and thermodynamic characteristics of the associated ejectors.

The description which follows of a number of non-limitative exemplary embodiments, given with reference to the accompanying drawings, will give a clear understanding of how the invention can be carried into practice.

IN THE DRAWINGS

FIGS. 3 and 4 are schematic longitudinal and cross-sectional showings of a conventional ejector with a divided flow deflected through 90°;

FIGS. 5 and 6 are schematic longitudinal and cross-sectional views of an alternative embodiment having a divided flow deflected through less than 90°;

FIGS. 7 and 8 are schematic longitudinal cross-sectional views of a conventional ejector having a single deflected flow;

FIGS. 9 and 10 are schematic longitudinal and cross-sectional showings of the ejector of FIGS. 3 and 4 equipped with a deflector according to the invention;

FIGS. 11 and 12 are schematic longitudinal and cross-sectional views of the ejector of FIGS. 5 and 6 equipped with a deflector according to the invention;

FIGS. 13 and 14 are schematic longitudinal and cross-sectional views of the ejector of FIGS. 7 and 8 equipped with another deflector according to the invention;

FIG. 27 is a detail view of an alternative embodiment; and

FIG. 28 is an explanatory diagram.

Figure 1:
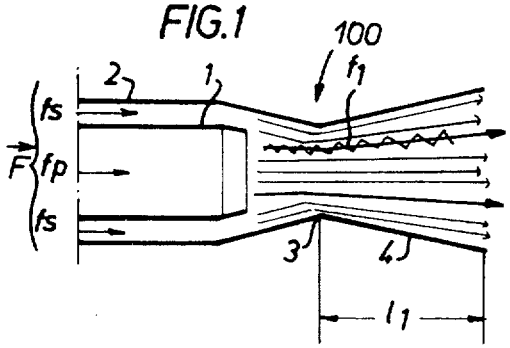
FIGS. 1 and 2 are schematic sectional views of a conventional ejector, with short and long mixing sections respectively.
Figure 2:
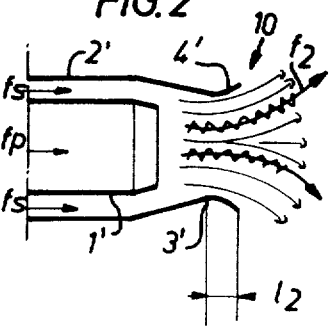

As may be seen from the schematic axial sectional views of FIGS. 1 and 2, an ejector consists essentially of a primary-flow-$fp$ duct 1, a secondary-flow-$fs$ duct 2, a throat 3 and a mixer 4. If the length $l_1$ mixer 3 is sufficient, the mixture which develops about a surface symbolized by the arrow $f_1$ will be homogeneous and uniform upon exit, whereas if the length $l_2$ of mixer 4' is too small, mixing will take place only partially about the arrow $f_2$.

It may be unavoidable in some cases to use an ejector 10 of the short-mixer type (FIG. 2) and to deflect the mixture (which is consequently not yet fully homogeneous) in conventional fashion (FIGS. 3, 5, 7).

Very careful observation shows that in such cases phenomena linked with these imperfections in flow homogeneity arise in different ways depending on the flow deflection or splitting modes imposed upon the primary and secondary flows.

These phenomena will now be analysed in greater detail with reference to the corresponding figures.

FIGS. 3 and 4 illustrate diagrammatically, in horizontal and vertical section respectively, an ejector with a fully channelled flow divided and deflected through 90° to either side of the direction of the main flows.

It may be seen from these diagrams that harmful backflows 5 start from the area of impact of the primary flow $fp$ on the opposite wall 6, in the direction of secondary-flow duct 2, in the region of the horizontal centerplane of FIG. 4, and stream back to meet the secondary flow $fs$. These backflows 5 flow round the primary duct 1, mix with the secondary flow $fs$, and are discharged therewith by the entraining effect of the primary flow $fp$ through discharge orifices 7 and 8, this effect being developed along the mixing surfaces symbolized by arrows $f_3$ and $f_4$.

FIGS. 5 and 6 illustrate diagrammatically in horizontal and vertical sections respectively, a deflected-flow ejector 100 through which the mixture is channelled and split to either side of the direction of the main flows $fb$, through a given deflection angle $\theta$. As the drawings show, the backflows 9 follow a path closely akin to that described precedingly, but in even more marked fashion.

FIGS. 7 and 8 schematically illustrate in horizontal and vertical sections respectively, a deflected-flow ejector 110 through which the mixture is channelled and deflected bodily as at 11. As shown in the drawings, the backflows 12 start from the impact area of the primary flow $fp$ on wall 6 and join up with the secondary flow $fs$ above primary duct 1, for mixing and discharge therewith at 11 by reason of the entraining effect produced by the undisturbed main primary flow $fp$. The entraining effect then develops along the mixing surfaces symbolized by the arrow $f_5$ on FIG. 7.

From these basic diagrams it will now be shown how the non-return deflector device according to this invention has the effect of reducing backflows off the primary flow, of providing extra counterthrust in a thrust reverser system and of lowering the back pressure that opposes the low pressure level which is desirable in secondary-flow duct 2.

In FIGS. 9 and 10, which correspond to the split-flow ejectors of FIGS. 3 and 4, two pairs of deflectors 12 and 13 fixed to the ejector side walls 14 and 15 are arranged symmetrically in accordance with this invention. These deflectors consist essentially of small individual rectangular plates, and their dimensional parameters ($\epsilon$, $\delta$) and positional parameters ($\beta$, $\alpha$) are dependent on the specific conditions of utilization of the ejector, such as flow velocities, pressures, temperatures and other factors.

As may be seen from FIGS. 9 and 10, the backflows 16 and 17 issuing from the zone of high statis pressure which is situated adjacent the wall 6 located opposite the primary flow and close to the horizontal centerplane flow into the wedge formed by each deflector 12 and 13 against the lateral walls 14 and 15 and are deflected and flow along the exit pipes 7 and 8 while continuing to form an integral part of the active primary flow. Obviously, the width must not be unduly great so as not to intercept the primary flow. Further, the angle $\alpha$ is preferably an acute or right angle, while angle $\beta$ may be in the vicinity of 90°. In such split-flow ejector configurations, the direction of deflection represented by the axes ox and ox' may form an angle of 180° in cases where the deflections are mutually opposed in the plane of the figures, or may form any other angle $\theta$ appropriate to each particular case considered.

FIGS. 11 and 12, which correspond to the split-flow ejectors shown in FIGS. 5 and 6, illustrate a symmetrical arrangement of the two pairs of deflectors 18 and 19 fixed against the lateral walls 20 and 21 of the ejector and providing a deflection angle $\theta$. Said deflectors likewise comprise small rectangular-shaped individual plates and their dimensional parameters ($\epsilon$, $\delta$) and positional parameters ($\beta$, $\alpha$) are similarly linked to the specific conditions of utilization of the ejector. Similarly, angle $\alpha$ is preferably an acute or right angle and $\beta$ may have a value close to the deflection angle $\theta$.

FIGS. 13 and 14, which correspond to the ejectors with uniquely deflected flows shown in FIGS. 7 and 8, illustrate a deflector 22 which comprises a frusto-conical flange portion which prevents the primary flow from flaring out downwards and guides it sideways and upwards where the pressure is low. Flange 22 also prevents backflows 23 from returning towards secondary duct 2. As stated precedingly, the parameters ($\gamma$, $\mu$, $\eta$, $\rho$) are again linked to the specific conditions of utilization of the ejector.

Figure 25:
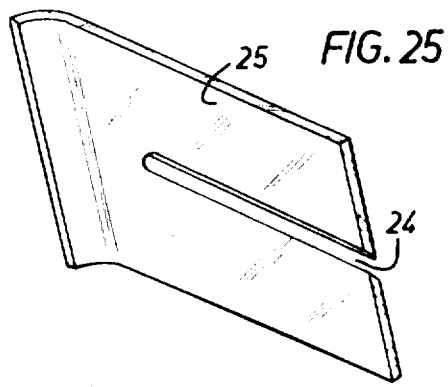
FIG. 25 is a perspective view of a non-return deflector detail.

By way of an alternative it is to be clearly understood that in cases involving asymmetrical configurations, the dimensional and positional deflector parameters will require to be adapted to allow for such asymmetry.

Where heavy fluids have to be mixed in conjunction with the use of a pipe bifurcating upwardly and downwardly, the said parameters will again require to be suitably adapted. Further, since it acts like a lifting surface, the backflow type of deflector described for greater clarity as having a simple shape may embody all improvements known to the specialist in the aerodynamic lifting surface art. More particularly, a deflector element 25 may be of the multiple type or comprise slots 24 as shown in FIG. 25.

The geometrical characteristics of the deflector will depend on the chosen configuration and on the characteristics of the fluid flows, which characteristics may vary according to requirements. Thus it may prove necessary to make the deflectors movable, deformable, or retractable to enable them to adapt to operating conditions.

Figure 26:
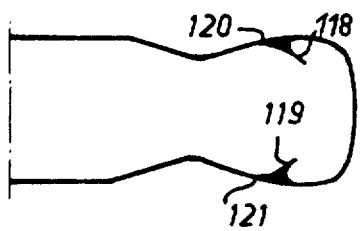
FIG. 26 is a schematic sectional view of an example of deflectors integrated into the structure of the side walls.

Conversely, the deflectors may be fixedly mounted and form an integral part of the ejector structure, as shown in FIG. 26 in which deflectors 118 and 119 are rigidly connected to walls 120 and 121.

Any known means may be used to form an obstacle and deflect the fluid streams. Recourse may be had in particular to the injection, through appropriate slots or holes, of a curtain of compressed fluid the total head of which is greater than that of the primary fluid, such injection being effected at an angle of incidence that opposes the backflow requiring to be deflected downstream.

An experimental deflector device according to the invention was experimented with by the applicant, in order to investigate application to aircraft jet engines equipped with a thrust reverser, and bore out some of the advantages to be expected from such devices.

Figure 19:
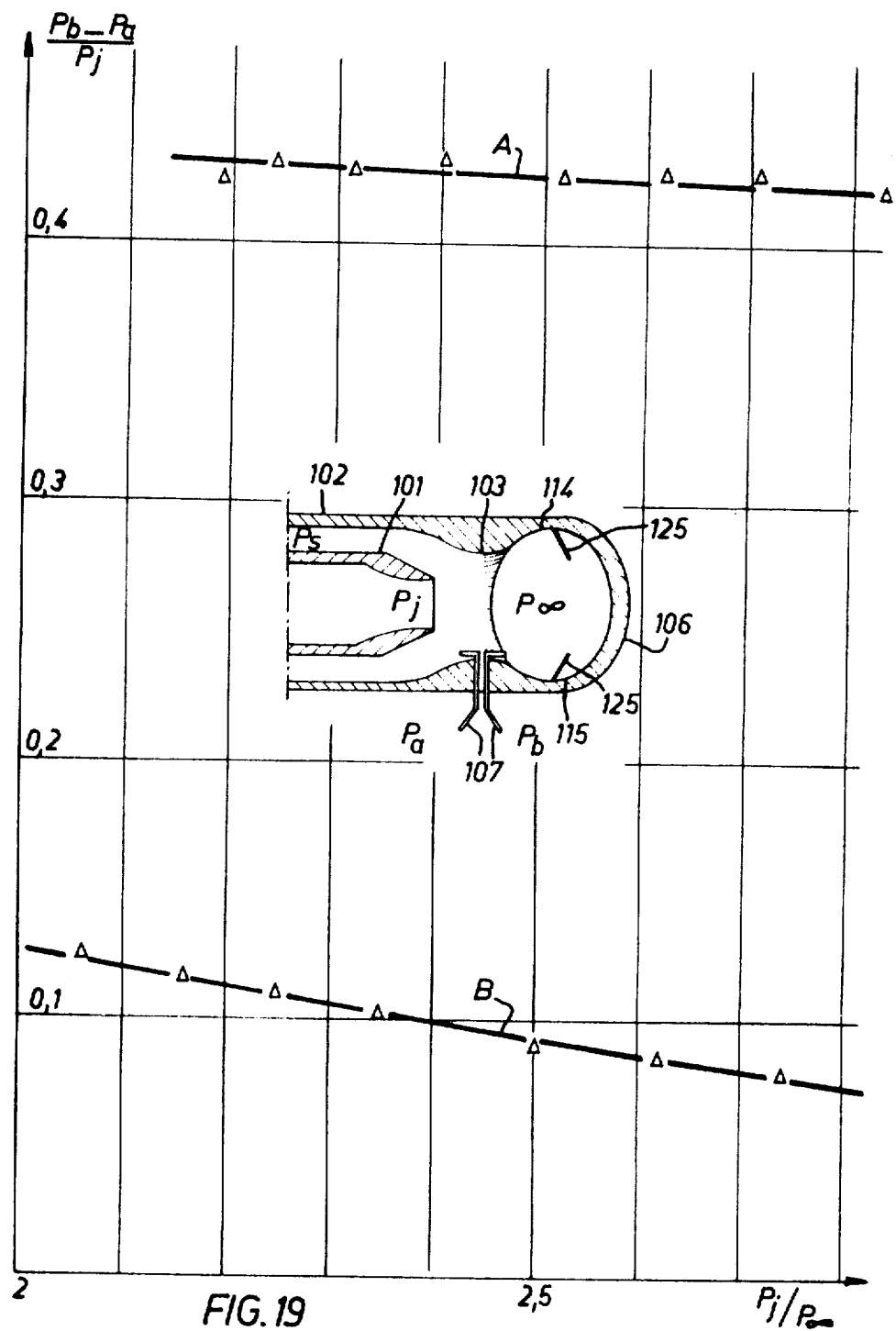
FIG. 19 is a comparative graph.

The diagrammatic sectional view represented between the curves on FIG. 19 is that of the arrangement used to obtain the measurements needed to reveal the basic phenomena involved and the effectiveness of the deflector device according to the invention.

This arrangement consists essentially of a primary duct 101, a secondary duct 102, a throat 103, an end wall 106, lateral walls 114 and 115 and deflectors 125, a system of reversed Pitot tubes 107 enabling the pressures Pa and Pb to be measured.

The notation adopted on the figures is as follows:
PJ — Total head of primary flow
Ps — Total head of secondary flow
P∞ — Atmospheric pressure
Pa — Downstream pressure
Pb — Upstream pressure.

FIG. 19 shows two characteristic curves, to wit a curve A obtained without a deflector and a curve B with deflectors. These curves reveal the effect of the backflows and their marked reduction obtained by the use of the deflectors. Indeed the presence of the subject deflector of this invention considerably diminishes the pressure gradient across the throat and, in consequence, the backflows into the secondary duct.

Figure 20:
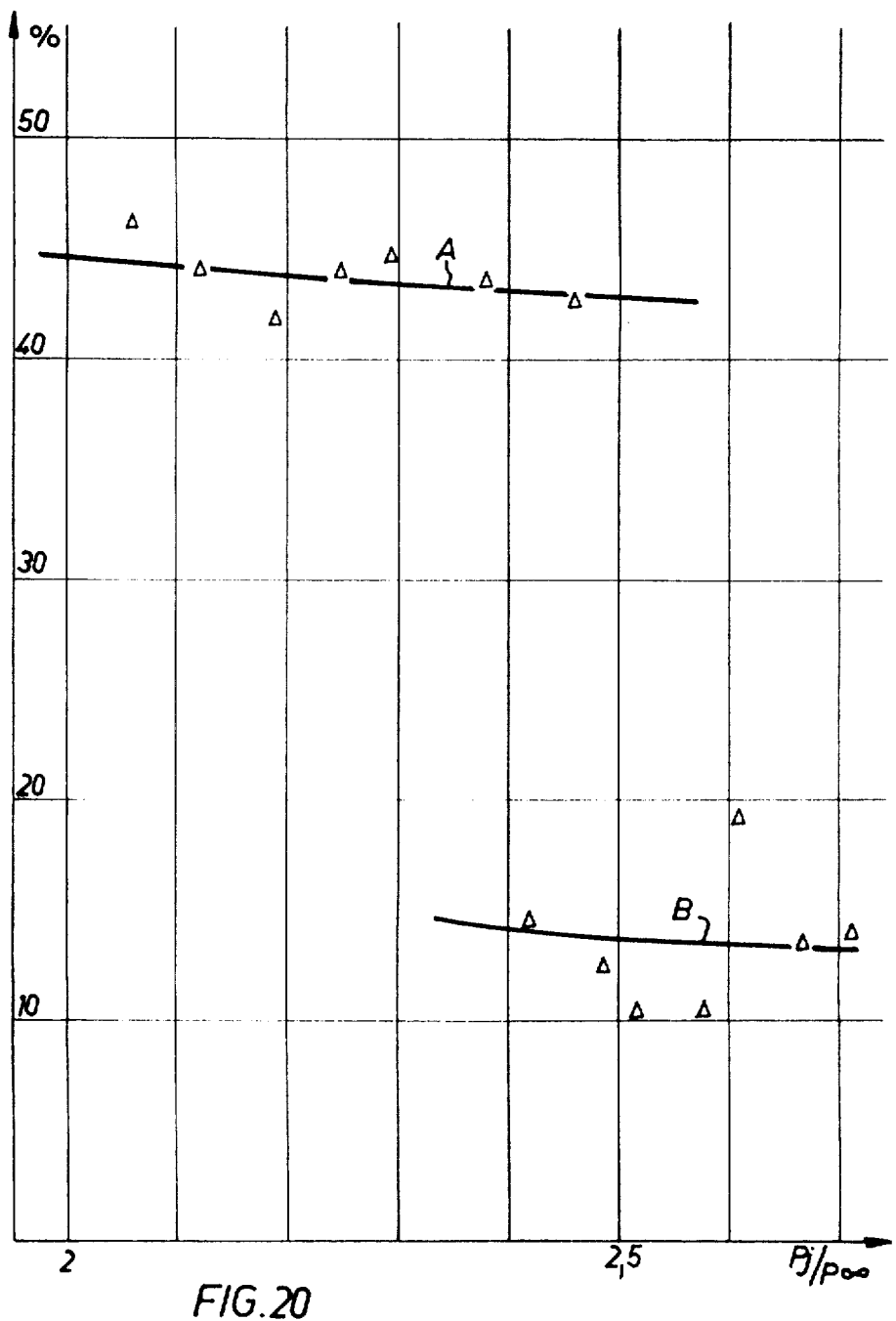
FIGS. 20 and 21 are curves depicting the gains achieved on a jet engine thrust reverser by the use of deflectors according to the invention.

FIG. 20 shows two characteristic curves, to wit a curve A obtained without a deflector and a curve B obtained with deflectors. These curves reveal the gain in reverse thrust obtained by the use of deflectors, the reverse thrust being in this case related to the thrust of the primary flow.

Figure 21:
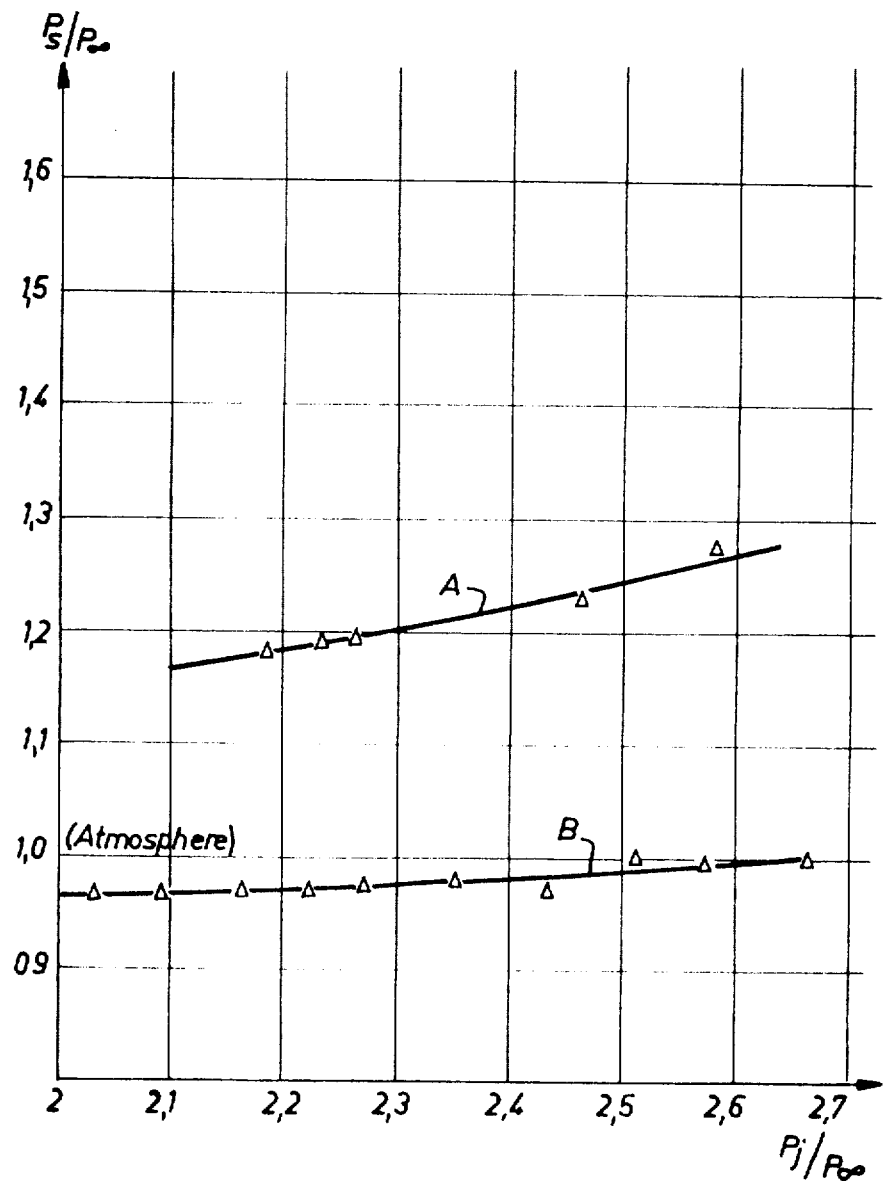

FIG. 21 shows two characteristic curves, to wit a curve A obtained without a deflector and a curve B obtained with deflectors. These curves clearly show the depression created in the secondary flow by providing the deflectors.

As is generally known, the main purpose of the thrust reversers is to deflect forwardly the gas stream exhausting from a jet engine, so as to obtain a reverse thrust which slows down the aircraft; it is likewise known that on supersonic aircraft the exit nozzles are very frequently of the two-flow type and accordingly form veritable ejectors. The wall facing the thrust-generating flow may be formed for example by two eyelids pivotally mounted to form a clamshell-type mask, the deflector according to the present invention being in that case positioned adjacent the two clamshell hinges.

Most thrust reversers may be divided into two types: Category-I thrust reversers (FIG. 15) in which the deflecting obstacle is formed by eyelids or retractable flaps 27, 28, 29, 30 positioned downstream of the exhaust nozzle end-section and capable of retracting in normal flight into the positions 27', 28', 29', 30'; and Category-II thrust reversers (FIG. 16) in which deflection is effected in part by retractable flaps 31 and 32 which in normal flight assume the positions 31' and 32' and by deflecting vanes or cascades 33 and 34 retractable as at 33' and 34'.

Figure 15:
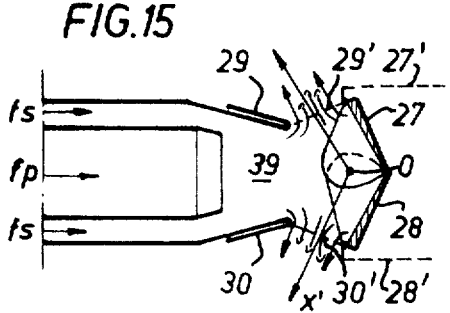
FIG. 15 is a diagrammatic sectional view of a conventional jet engine thrust reverser with masking clamshell on eyelid shutters at the rear.
Figure 16:
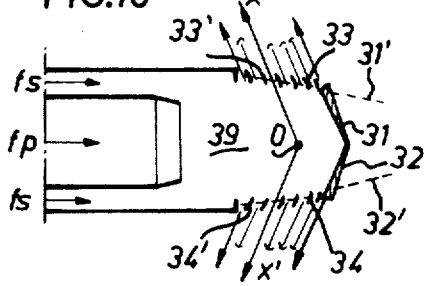
FIG. 16 is a diagrammatic sectional view of another conventional thrust reverser with cascade grids and buckets.
Figure 17:
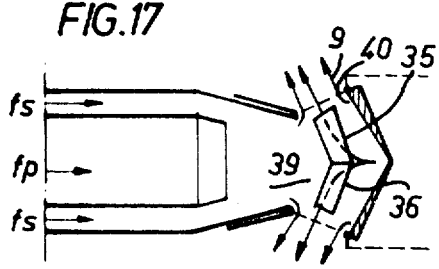
FIGS. 17 and 18 are schematic sectional showings of the thrust reversers of FIGS. 15 and 16 equipped with non-return deflectors according to the invention.
Figure 18:
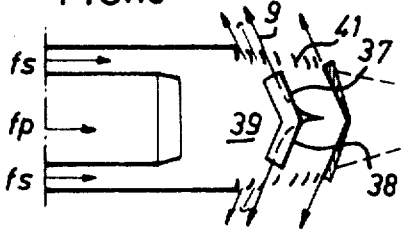

As shown in FIGS. 17 and 18 which correspond to FIGS. 15 and 16, in both these types of thrust reverser the present invention provides deflectors (35, 36) and 37, 38) according to the invention in proximity to the lateral walls 39, whereby the backflows 9 may be discharged, after mixing with the primary and secondary flows $fp$ and $fs$, through the exhaust orifices 40 and 41.

Figure 22:
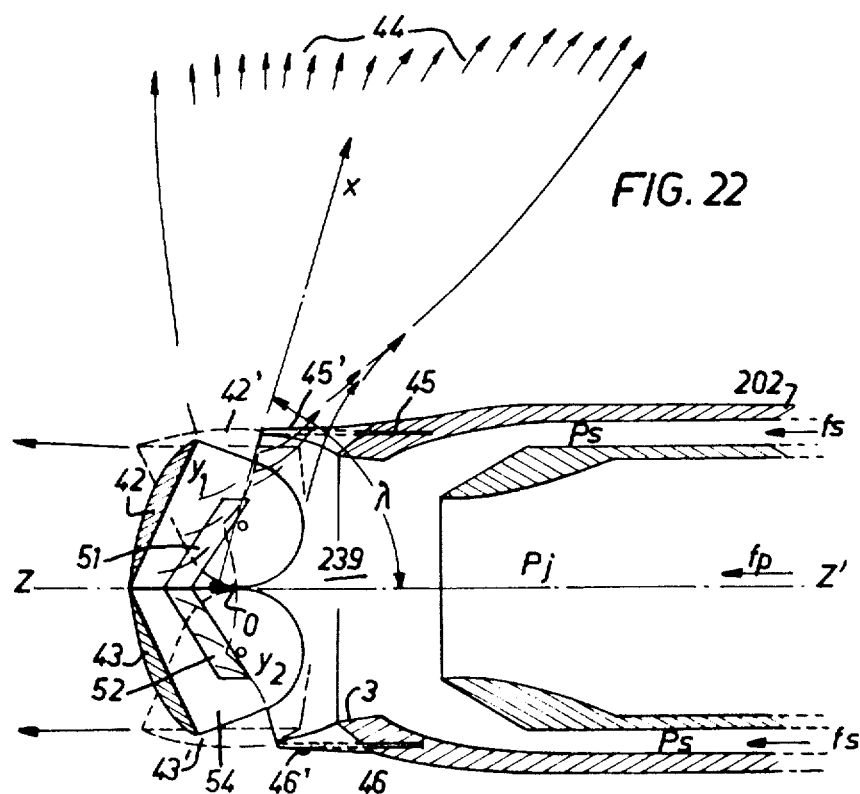
FIGS. 22 and 23 are schematic plans and sectional views of a thrust reverser for a clamshell-shuttered aircraft turbojet equipped with non-return deflectors according to the preferred embodiment of the invention.
Figure 23:
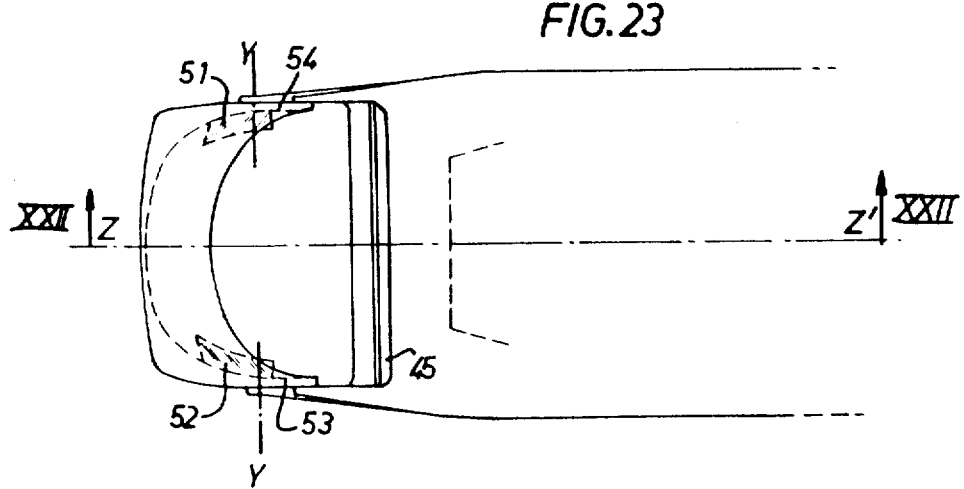
Figure 24:
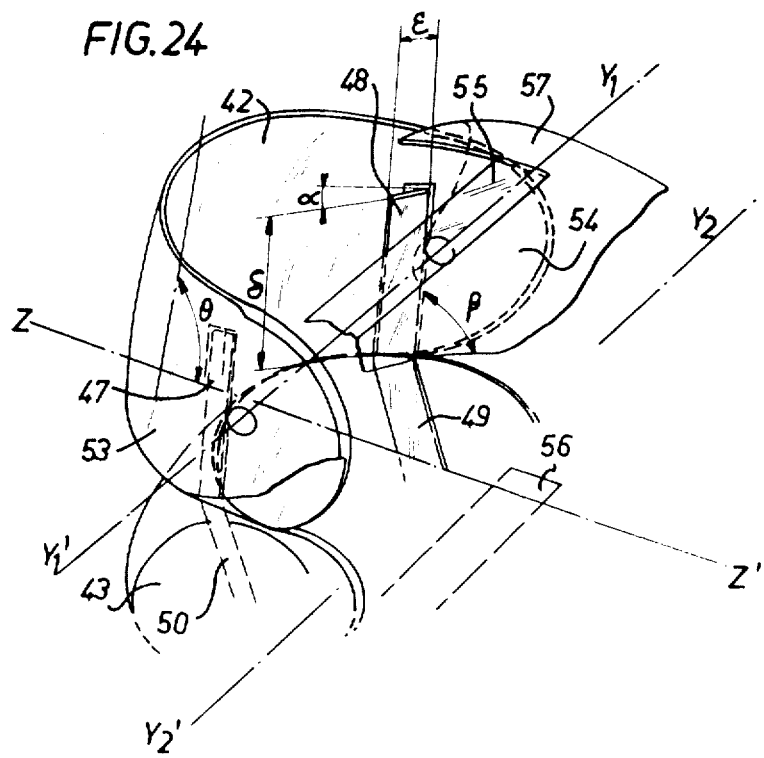
FIG. 24 is a perspective showing of the rear end of a turbojet according to the preferred form of embodiment of the invention.

The preferred form of embodiment of the invention, as applied to Category-I thrust reversers, is shown diagrammatically in FIGS. 22 and 23 and in simplified perspective in FIG. 24.

In this embodiment, which relates to a two-flow jet pipe, the downstream deflecting element is formed by eyelids 42 and 43 pivoted about hinge-lines Y1–Y1' and Y2–Y2' perpendicular to the main thrust line Z–Z'.

From the upper half-sectional view of FIG. 22, showing the general aspect of the reverse-thrust streamlines 44, it may be seen that pivotal motion of eyelids 42 and 43 allows either straight-through exhausting of the flows (eyelids in positions 42', 43', flaps at 45', 46') or deflected exhausting thereof along $o - x$ (eyelids in positions 42, 43 and flaps at 45, 46).

In a prior art configuration of this kind devoid of deflectors according to the invention, it was customary, during operation in the reversed-thrust mode, for backflows to be generated and to penetrate detrimentally into secondary duct 202 by streaming along lateral walls 239 in accordance with the process hereinbefore described, with the following consequences:

The secondary duct 202 is set under pressure, thus increasing the total angle through which the flow is deflected forwardly along $o - x$, and hence diminishing the reverse-thrust effect.

thermal and mechanical stresses in secondary duct 202 are increased, compelling the manufacturer to provide a substantially more massive structure so as not to shorten its useful life.

Hot gases penetrate into the secondary duct 202 and travel upstream if the secondary pressure $fs$ is low enough and gastight valving means are absent.

The non-return deflectors of this invention may be retracted at will. It may be seen that the deflectors 47, 48, 49, 50 shown in FIG. 24, and 51, 52 shown in FIGS. 22 and 23, make it possible to eliminate the above-listed drawbacks and to improve performance, as shown by the curves in FIGS. 19, 20 and 21.

The non-return deflectors 47, 48, 49, 50 are formed by plates retractable into housings formed in the side walls or eyelids 53 and 54 by means of mechanisms (not shown) which enable them to be extended only when said eyelids are in their thrust-reversing position. As shown in FIG. 24, the mechanisms for swiveling eyelids 42 and 43 about their hinge-lines and the mechanisms for extending flaps 55 and 56, housed in the outer structural portion 57, are well known per se and have therefore been omitted from the drawings.

A satisfactory application of the non-return deflection effect, for a two-flow type of jet pipe equipping a turbojet developing 150,000 Newtons, or approximately 33,000 pounds of thrust, led the Applicant to adopt the following values:

$$\beta=0 \quad \alpha=40° \quad \epsilon=150 \text{ mm.} \quad \delta=345 \text{ mm.}$$

It will thus be appreciated that the invention provides a new deflecting device designed to prevent the backflowing counterstreams which customarily occur in prior art ejectors and like deflected flow systems.

It was found however that in certain applications such as for jet engine thrust reversers, a fixed deflector of this kind might represent a notable obstacle to the exhaust flows when the nozzle configuration is that corresponding to the normal flight conditions and thereby cause a noticeable overall loss of efficiency, because of its drag. Also it might be desirable that the deflector does not penetrate deeply into the primary flow in such case.

The present invention accordingly provides a deflector which is split up into a plurality of deflector elements the several backflow-inhibiting characteristics of which are collectively equivalent to those of the deflector of the principal invention disclosed, while at the same time offering an obstacle of lesser magnitude to the flows impinging thereon.

The embodiment shown by way of example in FIG. 27 relates to a deflector according to the invention split up into three non-return deflector elements arranged in series, the one behind the other, and jointly offering a lesser obstacle to the direct flow for an overall backflow-inhibiting characteristic equivalent to or better than that of a single deflector.

Also, the presence of deflectors 12 and 13 may constitute a considerable obstacle tending to disrupt the natural flow of the incoming entraining streamlines and causes upstream vortices detrimental to satisfactory operation and efficiency of the device, for as shown by the elementary sketch in FIG. 28 the upstream flow F along the wall 14 impinges against the surface of the non-return wall 12.

As shown in FIG. 27, in order to avoid this disrupting effect the invention provides, by way of an alternative exemplary embodiment, the three deflectors 112, 113 and 114 extending transversely through a distance $e$ smaller than $\epsilon$ and collectively offering a backflow-inhibiting effect equivalent to that of a single non-fractionated prior art type of deflector 12.

The obstacle of transverse dimension $e$ opposed to the direct flow F is substantially smaller than the obstacle of transverse dimension $\epsilon$, whereby the overall efficiency of the system in particular is improved under the conditions obtaining with this preferred embodiment.

As FIGS. 27 and 28 clearly show, return streamlines F continue to be directed downstream of the main deflected flow, yet the apparent area offered to the flow F' prior to deflection is far smaller than in the case of a single deflector 12.

It goes without saying that many substitutions may be made in the preferred embodiment of the invention hereinbefore described, without departing from the scope of the invention, as defined by the appended claims.

I claim:

1. An ejector of the deflected flow type, including a primary duct and a secondary duct, the pressure in the primary duct being higher than that in the secondary duct, the secondary and primary flows being mixed on exit from a common throat-section, the mixture being deflected by an obstacle forming wall opposed transversely to the general direction of the two ducts, within at least one outlet means in a plane of symmetry of the ejector, at least two non-return deflectors being provided on either side of said plane of symmetry, adjacent lateral walls of the ejector and longitudinally generally parallel to said plane of symmetry in the return path of the primary flow deflected by said wall, whereby to deflect in a downstream direction those backflowing streams of said primary flow which are located laterally in relation to the outlet means and which would tend to flow back into said secondary duct.

2. An ejector of the deflected flow type according to claim 1, wherein said at least two deflectors are positioned in a longitudinal direction substantially parallel to the symmetry plane of deflection and along a plane slightly inclined transversely in relation thereto.

3. An ejector according to claim 2, wherein said deflectors comprise two lateral deflectors forming split flows arranged arrowhead-fashion along two opposed directions with the deflectors substantially parallel to the symmetry planes of the two split flows.

4. An ejector according to claim 3, comprising a deflector positioned adjacent said obstacle-forming wall set across said flows.

5. A deflector according to claim 1, comprising two exhaust flows forming an obtuse angle therebetween in the symmetry plane of deflection.

6. An ejector according to claim 1, including a thrust reverser wherein the obstacles of the wall opposing the flow of the partially mixed flows are arranged asymmetrically in relation to the symmetry plane of deflection, a hinged mechanism permitting a swivelling in multiple sections of said wall, the same being designed to form a retractable clamshell shutter and the deflectors along the lateral walls of the ejector being positioned adjacent the clamshell hinges.

7. An ejector according to claim 6, comprising pivoting flaps for controlled unmasking and masking of said outlet means.

8. An ejector according to claim 1, including a thrust reverser wherein the screen-forming wall obstacles comprise pivotal flaps the pivots of which are hinged on the side walls of the ejector adjacent the non-return deflectors.

9. An ejector according to claim 1, wherein the non-return deflectors are fast with the lateral walls.

10. An ejector according to claim 1, wherein said deflectors consist of high-pressure fluid jets.

11. An ejector according to claim 1, wherein the deflectors are retractable at will into the lateral walls.

12. An ejector according to claim 6, wherein said lateral walls are rigidly connected to the clamshell shutters adjacent the hinges thereof and carry bodily swivelling deflectors.

13. An ejector according to claim 12, wherein said deflectors are retractable into the hinge-portions of said clamshell shutters.

14. An ejector according to claim 1, wherein the non-return deflector is fractionated into a plurality of deflector elements having an equivalent collective backflow-inhibiting effect.

15. An ejector according to claim 14, wherein said non-return deflector elements are fast with the associated one of said lateral walls.

16. An ejector according to claim 15 including a thrust reverser, wherein the obstacles on the wall opposing the flow of the partially mixed primary and secondary flows are arranged asymmetrically in relation to the symmetry plane of deflection, a hinged mechanism permitting a swivelling, as multiple elements, of said screening wall formed by retractable clamshell shutters, the deflectors along the lateral walls of the ejector being located adjacent the clamshell hinges.

17. An ejector according to claim 16, including pivotal flaps for unmasking and masking said outlet means as required.

18. An ejector according to claim 17, wherein the screening-wall obstacles include pivotal flaps the pivots of which are hinged to the lateral walls of the ejector adjacent the non-return deflectors.

19. An ejector according to claim 1, wherein the non-return deflector is fractionated into a plurality of high-pressure fluid jets having an equivalent collective backflow-inhibiting effect.

* * * * *

UNITED STATES PATENT OFFICE
CERTIFICATE OF CORRECTION

Patent No. 3,660,982　　　　　　　　Dated May 9, 1972

Inventor(s) Albert Gozlan

It is certified that error appears in the above-identified patent and that said Letters Patent are hereby corrected as shown below:

In column 1, lines 9 and 10, the claim for priority should read as follows:

July 28, 1969　　France　　6925798

Dec. 30, 1969　　France　　6945547

Signed and sealed this 26th day of December 1972.

(SEAL)
Attest:

EDWARD M. FLETCHER, JR.
Attesting Officer

ROBERT GOTTSCHALK
Commissioner of Patents